United States Patent [19]

Nelson

[11] Patent Number: 4,779,167

[45] Date of Patent: Oct. 18, 1988

[54] HEADLIGHT FOR MINE VEHICLE

[75] Inventor: Robert C. Nelson, Daniels, W. Va.

[73] Assignee: John B. Long Co., Knoxville, Tenn.

[21] Appl. No.: 165,831

[22] Filed: Mar. 9, 1986

[51] Int. Cl.⁴ .............................................. F21V 29/00
[52] U.S. Cl. .................................... 362/61; 362/249; 362/294; 362/373
[58] Field of Search ................. 362/61, 80, 83, 249, 362/373, 362, 158, 267, 294

[56] References Cited

U.S. PATENT DOCUMENTS

| | | | |
|---|---|---|---|
| 3,936,686 | 2/1976 | Moore | 362/294 X |
| 4,069,415 | 1/1978 | Dacal | 362/267 X |
| 4,158,880 | 6/1979 | McJunkin, Jr. | 362/367 X |
| 4,229,780 | 10/1980 | Nelson | 362/222 X |
| 4,489,637 | 12/1984 | Herron et al. | 362/294 X |
| 4,729,078 | 3/1988 | Skegiw | 362/373 X |

Primary Examiner—Ira S. Lazarus
Assistant Examiner—Richard R. Cole
Attorney, Agent, or Firm—Luedeka, Hodges & Neely

[57] ABSTRACT

A dual-lamp headlight for use in underground mines or the like being capable of continuous output of illumination without exceeding an external surface temperature of 150° C. including improved housing means and heat dissipation means associated therewith.

8 Claims, 4 Drawing Sheets

HEADLIGHT FOR MINE VEHICLE

FIELD OF THE INVENTION

This invention relates to headlights for vehicles utilized in mines, especially dusty or gassy mines.

A primary design consideration for a vehicle headlight to be used in a mine, such as an underground mine where may be substantial accumulations of methane gas or substantial quantities of dust particles suspended in the mine environment, is that the headlight not only provide the desired illumination of the mine interior, but that the headlight itself not pose any hazard to the miners, nor any hazard as regards flame generation or explosions when in use. To this end, the Mine Safety and Health Administration (MSHA) requires that any headlight sold for use in mining environments be tested by MSHA and certified to meet the design and construction criteria such as set forth in 30 CFR Part 18. Among the tested parameters is a requirement that no external portion of the headlight shall exceed a temperature of 150 degrees centigrade (302 degrees Fahrenheit). Another criteria is that the lamp of the headlight be enclosed in a gas tight enclosure and that the lens of the headlight be capable of withstanding blows from a four pound spherical test ball. Still further, the assembled headlight is "explosion" tested by filling the interior of the headlight with an explosive mixture of natural gas and air, and igniting this mixture while the headlight is contained in a chamber which also contains an explosive mixture of natural gas and air. The headlight is required to withstand the explosive force of the internal explosion, and further to not allow propagation of a flame from the interior of the headlight to the surrounding external environment as would ignite a secondary explosion in the external environment. Such flame propagation can occur at sealing locations so that seal integrity is of major importance. Other criteria are found in the aforementioned 30 CFR part 18. As will be recognized, mine headlights are expensive to manufacture, test and to maintain.

Illumination of the interior of an underground mine, for example, frequently requires different types of light. Specifically, under certain environmental conditions a floodlight type beam is preferred, such as when illuminating a general area for workers. In other environments a more concentrated or spotlight type beam is required such as when penetrating dusty environments or when high intensity pinpointed light is desired on a specific work location. Heretofore all known headlights for mine applications have been of the single lamp type. Accordingly, heretofore it has not been possible for the vehicle operator to provide these alternate types of lighting with a single headlight, but rather a compromise had to be made as to which type of light was to be used. In many instances a compromise between a floodlight and a spotlight was chosen. This latter situation obviously provided less than desirable lighting in all events but was made in the interest of economy. Prior to the present invention, there has been no known dual-lamp headlight approved by MSHA for use in mines.

It is therefore an object of the present invention to provide a mine headlight having dual lamps which are selectable as to the type of light which they provide.

It is another object of the present invention to provide a dual lamp mine headlight which provides improved illumination while not exceeding specified external temperature limitations required thereof.

It is another object of the present invention to provide a mine headlight which has improved heat dissipation characteristics.

Other objects and advantages of the invention will be recognized from the description contained herein including the Figures in which.

In accordance with the present invention there is provided a dual-lamp headlight for a mining vehicle which comprises a housing including a base of a material having a relatively high coefficient of heat transfer and a cover member. The cover is generally of tubular geometry and open at its opposite ends. One end of the cover is adapted to be sealably received by the base member and its opposite outboard end is adapted to receive therein a lens member sealed in gas-tight relationship to the outboard end of the cover thereby defining an internal gas-tight chamber. Internally of the cover member there is provided a web means extending generally perpendicularly from the base member and into the interior of the cover member. This web member is likewise of a material having a relatively high coefficient of heat transfer and serves as the mounting location for two lamps, one on each of the opposite sides of the web member. The physical connection between the lamps and the web member is such that there is good heat transfer between the lamps and the web, hence good heat transfer from the web to the base member and from the base member to the external environment. Further, the cover is provided with radiation fins on the exterior perimeter thereof for aiding in dissipating heat generated internally of the headlight to the external environment. Importantly, the seal between the base member and the abutting end of the cover is designed to preclude the propagation of a flame therealong. In like manner the lens is sealed within the open end of the cover to also prevent the propagation of a flame along the juncture of the lens and the cover. In a preferred embodiment, the web member disposed internally of the cover is provided with an aperture through the thickness of the web, for purposes which will become apparent hereinafter, and tapered in thickness from the base to a location past the approximate midpoint of the web length. In one embodiment, the web is caused to be in heat transfer engagement with the inner surface of the cover, with equal or less substantial heat transfer engagement with the base member, to effect the transfer and effective dissipation of heat from the interior of the headlight to the external ambient environment.

DETAILED DESCRIPTION OF THE INVENTION

Figure 1:
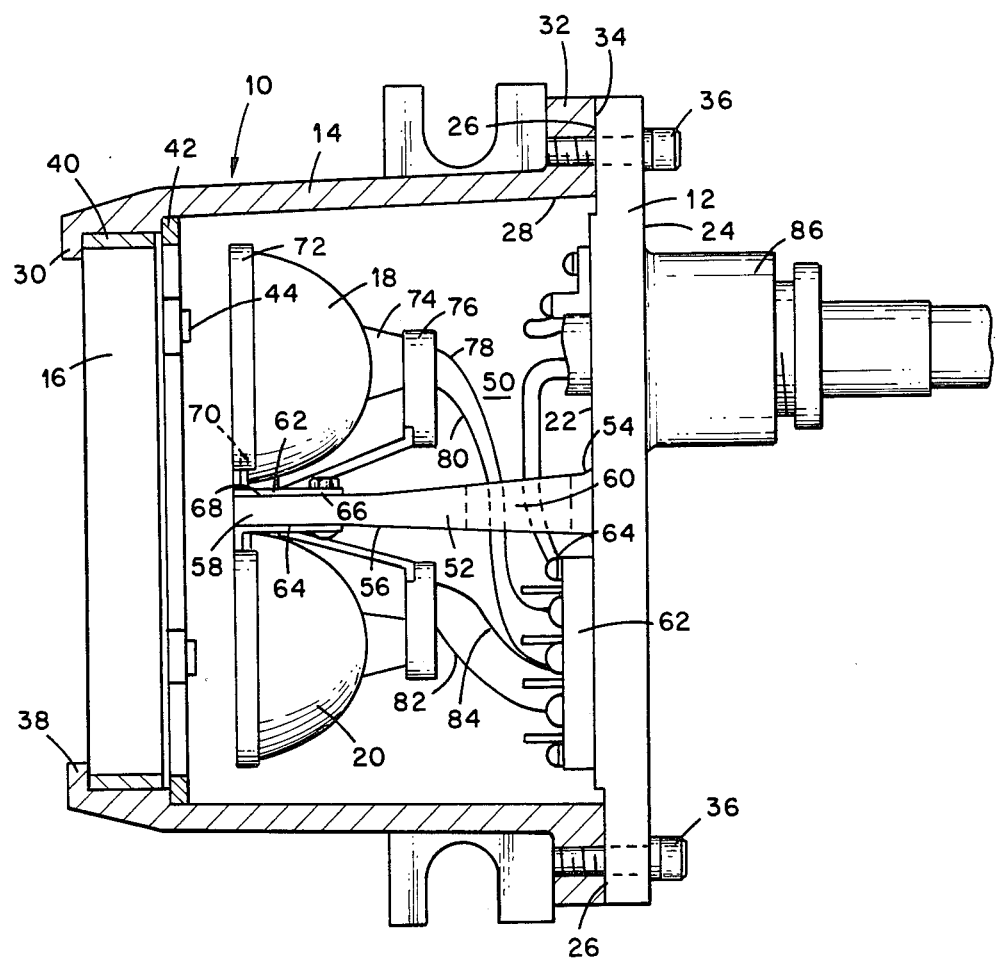
FIG. 1 is a top view, part in section, of a headlight in accordance with the present invention.

Referring now to the several Figures, in FIG. 1 there is depicted, partly in section, a headlight 10 including a rectangular base 12, a tubular cover 14, a lens 16, and two lamps 18 and 20.

As noted hereinabove, it is a requirement of MSHA that no portion of the external surface of a headlight used in mines shall exceed 302° F. Notoriously, lamps enclosed within sealed containers generate substantial quantities of heat. In the prior art it has been customary in mine headlights to provide a base that functions as a heat sink. To this end such prior art base elements have been of relatively large thicknesses, the concept being that heat generated within the enclosure will be transferred to the base and that such base have sufficient mass to serve as a sink of adequate capacity to absorb the heat generated by the internal lamp. The base clearly dissipates a portion of such heat to the external environment as to avoid the development of a "hot spot" at the base, but heretofore the base element has not been considered to be an effective element for dissipating substantial heat to the ambient environment. Rather, heretofore, radiating fins located on the cover or other elements of the headlights have been deemed most effective in dissipating heat generated by the single lamp of such prior headlights. This concept, in part, has been based on the premise that the heat dissipation means should be located as close to the source of heat, i.e. the lamp, as possible for maximum effectiveness. Contrary to such prior concepts, the present inventor provides a base 12 which is relatively thin and therefore not substantially effective as a heat sink, and further provides a good path for heat transfer from the heat source, i.e. lamps, to the base. The thickness of this base is chosen to provide adequate structural integrity to the base and to the headlight while maintaining a minimum thickness, such that heat absorbed by the base on its interior surface 22 is rapidly transferred through the thickness of the base to the external surface 24 thereof and dissipated to ambient environment. Notably, such heat dissipation occurs without the application of cooling to the base other than the normal flow of air therepast during use.

The perimeter of the base 12 is provided with a sealing surface 26 that extends fully around the perimeter of the base. This sealing surface is provided with a very smooth surface finish which is engaged by the end 28 of a hollow tubular cover 14 having open opposite ends 28 and 30. The end 28 of the cover 14 is provided around its perimeter with a mounting shoulder 32 which is adapted to engage the sealing surface 26 around the perimeter of the base 12. The end surface 34 of the shoulder 32 also is provided with a very smooth surface finish similar to the surface finish on the sealing surface 26 of the base 12. These surfaces are brought into sealing engagement with one another and retained as by bolts 36 disposed around the perimeter of the base. In this manner, the abutting surfaces 26 and 34, with no gasket material therebetween, provide a seal along which no flame can propagate from the interior of the headlight to the ambient environment.

Figure 2:
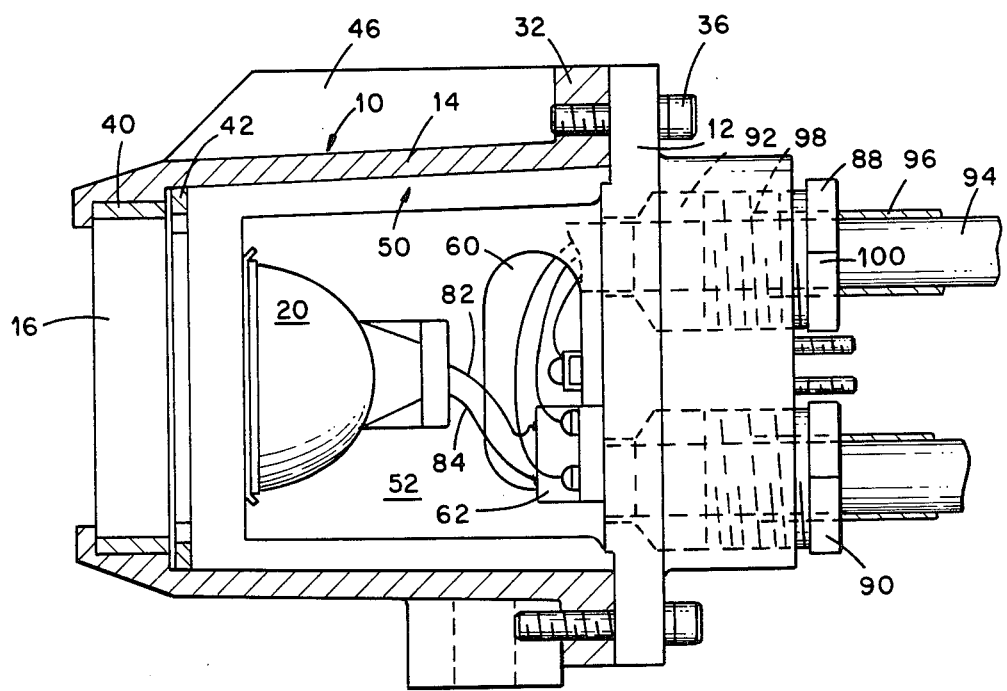
FIG. 2 is a side view, part in section, of the headlight depicted in FIG. 1.
Figure 3:
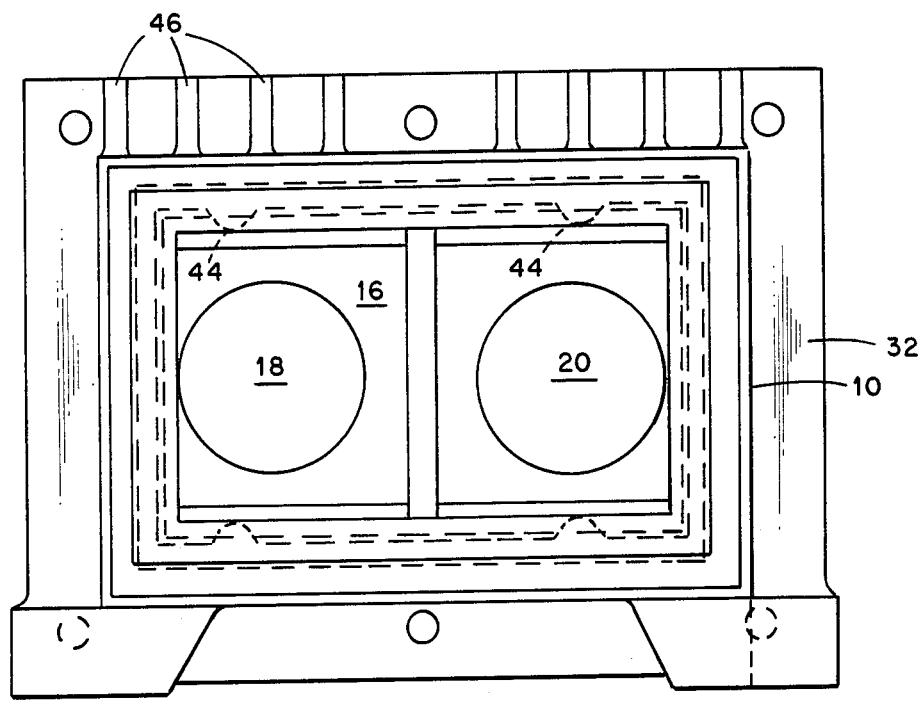
FIG. 3 is a front end view of the headlight depicted in FIG. 1.
Figure 4:
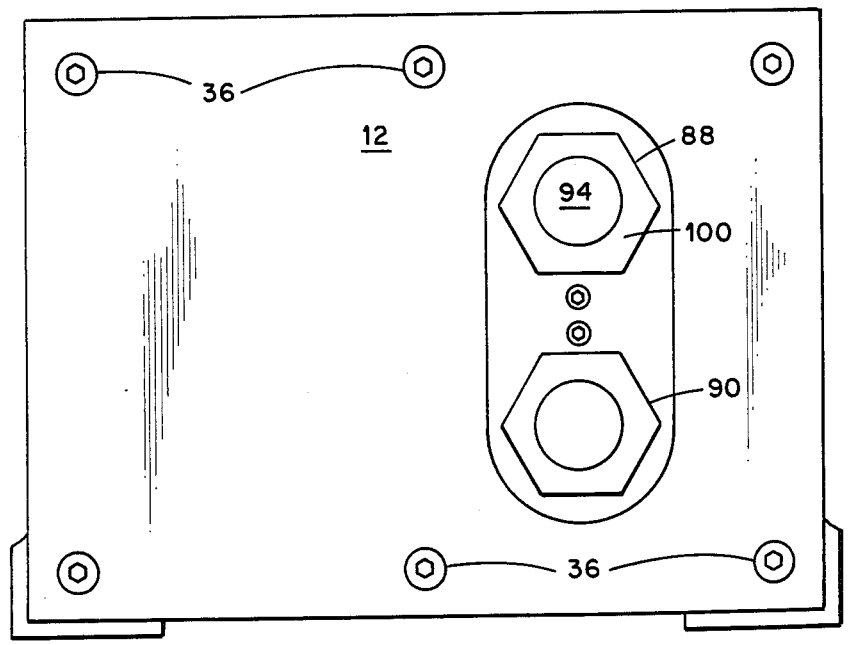
FIG. 4 is a rear end view of the headlight depicted in FIG. 1.

The opposite end 30 of the cover 14 is provided with a circumferential shoulder 38 which projects inwardly of the cover and serves as an outward stop for the lens 16. This lens is sealed in its closing position with respect to the open end 30 of the cover 14 as by means of an epoxy seal 40 or other acceptable gas-type sealing mechanism. A retaining ring 42 is secured inwardly of the lens 16 around the inner circumference of the cover 14 to define a stop against inward movement of the lens 16. In a preferred embodiment this retaining ring 16 is of metallic construction and held in place as by tack welds 44. As may be seen best in FIG. 2, the cover 14 is provided on its external surfaces with a plurality of fins 46 that are adapted to dissipate heat from the cover 14 to ambient atmosphere.

When the cover 14 is sealed to the base 12, there is defined internally of the cover 14 a gas-tight chamber 50. In accordance with the present invention, the base 12 is provided with a central substantially planar web 52 that extends from the base 12 into the chamber 50. In a preferred embodiment, this web 52 is tapered from its juncture 54 with the base 12 to a location 56 approximately two-thirds of its length. The web 52 is further provided with an outboard section that is of generally uniform cross-sectional dimensions. The thickness of the web 52 at its juncture 54 with the base 12 is substantially equal to the thickness of the base 12 so that there is good heat transfer between the web 52 and the base 12. The preferred taper is between about one and ten degrees thereby providing an increasingly larger cross-sectional area of the web between the outboard location 56 at the beginning of the taper, and extending in the direction of the base 12, thereby providing an increasingly larger heat sink value of the web from the beginning of its taper to its juncture with the base 12. Within the tapered section of the web there is provided an aperture 60 extending through the thickness of the web. This aperture serves as a conduit through which electrical connections between the lamps 18 and 20 may be made to a terminal block 62 mounted as by screws 64 to the inner surface 22 of the base 12.

Within the chamber 50 the lamps 18 and 20 are mounted to the outboard end 58 of the web 52 as by means of brackets 62 and 64. These brackets are substantially identical and each is of generally L-shape geometry having a first planar leg 66 that lies in intimate contact with the one flat surface 68 of the web 52 and a second planar web 70 that projects at substantially right angles from the web 52 to support a lamp holder 72 adapted to receive the outer rim of the lamp 18 therein. The base 74 of the lamp 18 is received in a socket 76 to which there are connected electrical leads 78 and 80 that lead to the block 62. In like manner the lamp 20 is mounted on the opposite side of the web 52 and includes electrical leads 82 and 84 that are connected to the block 62.

On the outer surface 24 of the base 12 there is provided a hub 86 which serves to mount therein two packing glands 88 and 90 adapted to provide for gas-tight sealing of electrical cables passing from outside the headlight through the base to the interior chamber 50. Each packing gland, 88 for example, includes a packing 92 disposed within the hub 88 and adapted to encircle an electrical cable 94 that is passed through a metal tube 96 which terminates with a flared end 98 at a location outboard of the packing 92. A packing lug 100 is threadably received within the hub and serves to apply pressure to the packing 92 to seal the cable within the hub and prevent the movement of gases into or out of the chamber 50 through the packing gland.

In a preferred embodiment of the present headlight, the base 12 and cover 14 are fabricated of 115 brass alloy, 123 brass alloy, 319 aluminum alloy or their equivalents as respects their nonsparking and heat transfer properties. The base 14 in a preferred embodiment is of generally rectangular geometry and has a major dimension (length) of about $7\frac{1}{4}$ inches, a minor dimension (width) of about $5\frac{5}{8}$ inches, and a thickness of about $\frac{1}{2}$ inch. It has been found that a thickness on the order of 6 to 10 percent of the major dimension of the base provides for efficient transfer of adequate quantity of heat from the interior of the housing 14 through the base to ambient external atmosphere in the absence of applied cooling of the base other than normally-occuring air currents therepast. The cover, in a preferred embodiment, is about 6⅞ inches wide, 5⅛ inches high and 4⅝ inches long with a wall thickness of about 3/16 inch. Whereas the heat radiating fins provided on the external surface of the cover aid in dissipating heat from the headlight, their effectiveness is limited due to the fact that heat from the lamps reaches the cover primarily by radiation or convection.

Dissipation of heat via the base 14 is dependent upon the transfer of heat from the dual lamps to the base primarily by conduction. As noted, this is accomplished through the means of the cantilevered web 52. This web preferably is fabricated of the same material as the base thereby providing as nearly as possible an uninterrupted ideal conductive heat transfer path from the lamps to the base. In the depicted and preferred web, the web is about 2¾ inches wide, 3⅛ inches long and is tapered in thickness from about ½ inch thickness at the juncture of the web and the base to about ¼ inch thickness at a location past the midpoint of the web length, and preferably over about ⅔ of the web length, e.g. for a distance of about 2 inches. This taper provides an increasing thickness, hence an increasing size heat sink in the direction away from the lamps 18 and 20 toward the base 12 to enhance the withdrawal of heat from the lamps and transfer of the same to the base for dissipation to the external atmosphere. Such increasing thickness is partly made necessary by reason of the presence of the aperture through the thickness of the web in its tapered region. As noted, this aperture serves as a passageway for electrical conductors. Its presence, however, takes away a portion of the mass of the web so that with the addition of the taper to the web, there is no overall reduction in the mass of the web over its length as would impart a deleterious effect upon the web's heat transfer property. Thus, it will be seen that the degree of taper of the web is a function of the web mass that is removed in producing the aperture, and should be such that the taper provides an increased mass of the web that is substantially equal to or greater than the web mass removed in forming the aperture. As noted, a taper of between about 1 and 10 degrees is suitable, depending upon the volume of the aperture. Normally, the aperture is only of sufficient size as provides for the passing of electrical leads therethrough, e.g. an oval opening having a major and minor dimensions of about 2 inches and ⅛ inch, respectively. In a preferred taper, there is a total increase in mass of about 25 percent from the location of minimum web thickness to its juncture with the base.

By reason of the heat dissipation characteristics of the present headlight, as noted above, two lamps 18 and 30 may be mounted within the housing. As desired, these lamps may be identical as regards the definition of their beam. More frequently, it is desired that one lamp provide a piercing-type beam, for example, a Sylvania MR-16 EZX, 20 watt lamp, and that the other lamp provide a flood-type beam, for example, a Sylvania MR-16 EXN, 50 watt lamp. Electrical connection of the lamps for selective activation of the lamps will be obvious to one skilled in the art. In mounting the lamps within the chamber 50, it has been customary in single lamp headlights to not position the face of the lamp closer than about ½ inch from the lens cover. However, the present inventor has found that when employing the present invention, this separation can be reduced to less than about ¼ inch without developing a hot spot on that portion of the lens cover immediately in front of the lamp face. This is true even though the present invention contemplates at least twice the candlepower of the prior art lights.

Figure 5:
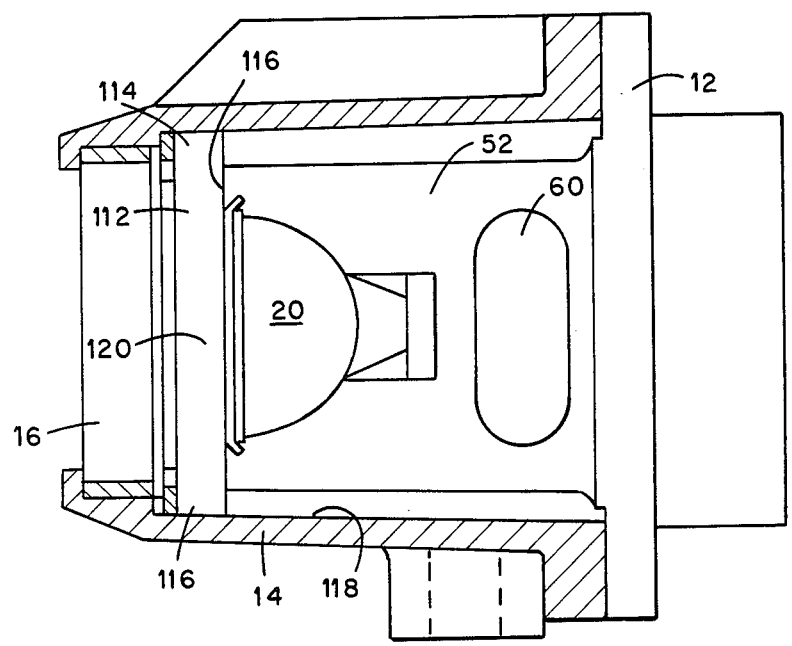
FIG. 5 is a top view, part in section, of a further embodiment of a headlight in accordance with the present invention.

In a further embodiment as depicted in FIG. 5, the web 52 is further in contact at its outboard end 110 with an elongated strip 112 of metal having good heat transfer characteristics. In the depicted embodiment this strip 110 is about ½ inch wide, about ¼ inch thick and of sufficient length to extend diametrically across the vertical dimension of the inside of the cover 14 as viewed in FIG. 5. The opposite ends 114 and 116 of the strip preferably are frictionally received in contact with the inner wall 118 of the cover 14. Alternatively, appropriate slots (not shown) may be provided in the inner wall of the cover to receive the strip ends. In any event, such ends are disposed in good heat transfer contact with the cover wall. The depicted location of the strip 112 provides for the mid-section 120 of the strip to be in heat transfer engagement with the outboard end 110 of the web and thereby transfer heat generated by the lamps in a lateral direction toward the cover, in addition to heat transfer along the web toward the base. It is to be recognized that the strip may comprise extensions from opposite side edges of the web which reach to and engage the inner wall of the cover in good heat transfer relationship, such extensions being located at essentially any position, or positions, along the length of the web, even to the extent of the web being of sufficient width to engage the inner wall of the cover. This latter embodiment is less preferred due to manufacturing, assembly and maintenance costs. As will be further recognized, the inclusion of the strip or its equivalents, serves to supplement the transfer of heat from the interior of the headlight via the web through the base, thereby providing enhanced heat transfer or permitting one to reduce the extent of the contact area of the web with the base while accomplishing at least equal heat transfer from the interior of the headlight.

What is claimed is:

1. A dual-lamp headlight for use in underground mines or areas having like hostile environments said headlight being capable of continuous output of illumination without exceeding an external surface temperature of 150 degrees Centigrade in the absence of applied cooling other than normally-occurring air currents therepast comprising:

housing means including a base of material having a relatively high coefficient of heat transfer, and a cover, said cover being of generally tubular geometry and open at its opposite ends, means releasably and sealably connecting one end of said cover to said base;

lens means sealably secured to that end of said cover opposite said base;

web means of a nonsparking material having a relatively high coefficient of heat transfer projecting in cantilevered fashion from said base and into the interior of said cover when said cover is connected to said base and defining a heat transfer path to said base;

first and second lamp means each having a base portion and a rim portion;

means mounting said lamps on opposite sides of the outboard end of said web means, each such mounting means comprising a planar bracket of a material having a relatively high coefficient of heat transfer removably receiving at one of its ends the rim portion of said lamp and its other end being secured to the outboard end of said web thereby defining a heat transfer path between said lamp and said web, hence a heat transfer path via said web to said base and thence to ambient atmosphere externally of said housing, and heat transfer means disposed on the outer surface of said cover.

2. The headlight of claim 1 wherein said base is of a thickness on the order of about 10 percent of its major dimension, thereby providing a path for effective transfer of heat from the interior of said housing through said base to ambient atmosphere external of said housing.

3. The headlight of claim 1 wherein said web means tapers in thickness from said base to a location on said web means past the midpoint thereof.

4. The headlight of claim 3 wherein said taper is between 1 and about 10 degrees.

5. The headlight of claim 1 wherein said headlight is fabricated from a material from the group consisting of 115 brass, 121 brass, 319 aluminum alloy, and their equivalents as respects their heat transfer and nonsparking properties.

6. The headlight of claim 1 and including heat transfer means extending between said web and the inner wall of said cover to provide a further heat transfer path from said web through said cover to the ambient environment.

7. A dual-lamp headlight for use in underground mines or areas having like hostile environments, said headlight being capable of continuous output of illumination without exceeding an external surface temperature of 150 degrees Centigrade in the absence of applied cooling other than normally-occurring air currents therepast comprising:

a generally straight tubular housing of a nonsparking material having a coefficient of heat transfer at least about equal to 319 aluminum open at its opposite ends and having a relatively thin wall thickness to provide for effective heat transfer from the interior of said housing, through the wall thereof, and to ambient atmosphere external of said housing;

heat transfer fins disposed on the external surface of said housing;

base means including a generally planar portion of a material having a coefficient of heat transfer at least about equal to 319 aluminum and adapted to be removably and sealably engaged with one open end of said housing, said base means having a thickness on the order of 10 percent of its major dimension thereby providing a path for effective transfer of heat from the interior of said housing through said base to ambient atmosphere external of said housing, and planar web means of a material having a coefficient of heat transfer at least about equal to 319 aluminum and projecting in cantilevered fashion from said base and into the interior of said housing to define an effective heat transfer path to said base, said web means including a first section thereof adjacent said base which tapers in thickness inwardly to a location past the approximate midpoint between the attachment location of said web to said base and the outboard end of said web, said taper being between 1 and 5 degrees, and a second section of substantially uniform thickness that extends from said tapered portion to said outboard end of said web, and means defining an aperture through the thickness of said web in the tapered first section thereof, said aperture having an area of less than about 25 percent of the area of said tapered portion of said web;

lamp means having a base portion and a rim portion; and means mounting said lamp to said web means comprising a planar bracket of a material having a relatively high coefficient of heat transfer removably secured at one of its ends to the rim portion of said lamp and its other end secured to the outboard end of said web thereby defining a heat transfer path between said lamp and said web, hence a heat transfer path from said lamp via said web to said base and thence to ambient atmosphere externally of said housing.

8. The headlight of claim 7 and including heat transfer means extending between said web and the inner wall of said cover to provide a further heat transfer path from said web through said cover to the ambient environment.

* * * * *